United States Patent Office 2,964,410
Patented Dec. 13, 1960

2,964,410

ART OF PRODUCING AQUEOUS BASED LIQUID FOOD SUBSTANCES

George H. Kinsman, Wauwatosa, and Nison N. Hellman, Milwaukee, Wis., assignors to Basic Products Corporation, Milwaukee, Wis., a corporation of Wisconsin No Drawing. Filed May 15, 1958, Ser. No. 735,371

7 Claims. (Cl. 99—151)

The present invention relates to the preparation of liquid food substances and more particularly to the preparation of non alcoholic aqueous beverages such as milk, fruit juices, fruit flavored beverages, and the like.

It is well known that many aqueous based liquid food substances, which are either solutions of suspensions of the food product in water, develop definite off-flavors associated with chemical deterioration upon standing, particularly after the products have been exposed to oxygen from the atmosphere. The development of off-flavors and deterioration of taste is outstandingly noticeable in the case of milk and orange juice for example, both of which are aqueous based beverages which are highly susceptible to chemical deterioration. The off-flavors which develop in these food substances are quite pronounced and being readily noticed, are a source of dissatisfaction to consumers.

Milk, when exposed to light or to certain metals such as copper, rapidly deteriorates to produce the undesirable tastes and off-flavors. The use of highly sterile conditions and stainless steel equipment in the processing plants has corrected this problem to some extent although it is difficult to prevent exposure of milk to light or to exclude completely substances affecting the development of off-flavors.

In the case of fruit juices, such as orange juice, the presence of oxygen results in a flavor change in the liquid with the formation of outstanding characteristic off-flavors. These off-flavors are particularly predominant once the orange juice has been exposed to air and then stored for a few hours. The off-tastes develop even when the orange juice, or milk, is stored in a refrigerator. The extent of the deterioration is believed to depend upon a number of factors including time, temperature, exposure to light, and the presence of certain ingredients in the liquid. Although in commercial practice every effort is made to minimize the influence of such factors, the handling of the food substance unavoidably involves the introduction of a number of accelerator effects leading to the development of off-flavors in the product.

It is the primary object of the present invention to provide an improved, readily obtainable, antioxidant for aqueous based liquid food substances for the purpose of preventing chemical deterioration and the production of off-flavors in the food. More specifically it is an object of the invention to provide an antioxidant substance for improving the stability of milk and orange juice, which substance is not only wholesome and completely unobjectionable for food use, but which does not impart any odor or taste of its own to the food nor accentuate or mask flavors derived from the food constituents.

Another object of the present invention is to provide an antioxidant of the foregoing character which is effective in preventing the oxidation of any natural constituents of the food product and which is stable before use, in transit and during storage. Still another object is to provide an antioxidant of the above character which need be used only in trace or very small quantities.

Still a further object of the present invention is to provide an antioxidant of the foregoing type which is easily used and does not require complicated procedures or processes for addition.

A more specific object of the present invention is to provide an improved antioxidant for aqueous suspended food products such as orange juice and milk, comprising 2,4,5-trihydroxybutyrophenone. More particularly, it is an object of the invention to provide an improved method of stabilizing orange juice, milk and the like against oxidation, comprising the addition to the food product of 2,4,5-trihydroxybutyrophenone, whereby the original flavor or taste and other desirable characteristics of the food product are maintained over longer periods of time than heretofore obtainable with known antioxidants and even though substantial amounts of air or other sources of chemically combinable oxygen are present in the containers in which the beverages are packaged.

As pointed out above, it is known that if a food product, such as orange juice, is exposed to the atmosphere and allowed to sit over a period of time, which may even be relatively short, that a definite and noticeable off-taste appears. This off-taste is outstandingly noticeable when the older juice is compared to a fresh product. The same phenomenon is noticed with milk, particularly if there is exposure to light or if the processing equipment allowed even traces of contamination with metals such as copper. The taste of an oxidized sample of orange juice or milk is easily detected by any moderately trained taste tester, and in fact, a difference in taste between an older oxidized product and a fresh product can be readily detected by most consumers.

In accordance with the present invention, an aqueous food substance is stabilized against oxidation without substantially affecting its taste and other desirable characteristics, by adding to the product, at any suitable stage in its production, for example before packaging, the substance 2,4,5-trihydroxybutyrophenone (THB). The actual amount of the compound THB to be added depends upon a number of factors, including the amount of air in the head space in the package, the amount of air entrapped, occluded or dissolved during production and processing of the food product, the treatment or packaging of the product, and variations in the product itself. For instance, orange juice initially contains quite a high concentration of ascorbic acid which, however, is insufficient or incapable of protecting the orange juice from oxidation. These natural substances will, of course, influence the amount of antioxidant material that may or need be added. The food substance may be a solution of the food in water (e.g. milk) or may be a suspension (e.g. orange juice). The THB has been found to be equally effective for both.

Accelerated tests have been made upon orange juice and milk and the examples set forth below illustrate the effect of additions of THB on preservation of flavor and the prevention of the development of an off-taste. Because the taste of an oxidized sample of both orange juice and milk is very readily detected upon comparison with a fresh sample of a food product by even the most inexperienced tester, the surest way of evaluating the tests is by a simple organoleptic taste test. The tests are necessarily accelerated so as to obtain noticeable variations in taste in a relatively short time. The results of these tests can, however, be extrapolated over the expected shelf life of the food substance in order to predict the effect of additions of the THB as a stabilizer or antioxidant.

EXAMPLE I

Scrupulously clean 12 oz. bottles were filled with orange juice freshly squeezed from California Valencia oranges. No extraneous preservatives were added. The crowns and lips on the bottles were maintained sterile with 70% aqueous methanol solution to insure that no bacteria was added. 300 ml. of juice were added to each bottle, leaving approximately 75 ml. of air in the head space. Different amounts of THB antioxidant, expressed as milligrams per liter (mg./liter) of juice, were added to different bottles, and some of the bottles were left untreated as controls.

Following 7 days of storage at 30° F. and with daily shaking, the untreated aerated controls were found to be highly oxidized with a very noticeable off-taste, whereas the antioxidant treated samples were free of any oxidized flavor.

The taste tests were carried out using a panel of between 6 and 8 members. In the rating tests, the flavor of the various samples, after they had been treated according to the regular assay procedure as described above, was scored by the members of the taste panel according to 4 classifications: (1) least oxidized, (2) next most, (3) next most, and (4) most oxidized. A sample designated least oxidized would obtain a score of 1, and a sample designated most oxidized would obtain a score of 4, with the intermediate classes receiving 2 and 3 respectively. The results of such tests would score a poorly protected sample higher than one which contains a lower level of oxidized flavor. An average score is calculated by dividing the total score for any given sample by the number of panel members.

In the following table there is tabulated the rank difference of the action of different amounts of THB in the orange juice samples when taste tested. The rank difference is calculated by setting the average score of the untreated orange juice as zero (0). The difference between the average score of the treated orange juice and the untreated sample is defined as the rank difference. Thus defined, a negative rank difference indicates a level of protection, while a positive rank difference is indicative of zero protection or flavor reversion. This table is a composite based on an average of taste test results obtained.

*Table I*

THB EFFECTIVENESS IN ORANGE JUICE

Treatment, THB added in mg./liter:     Rank difference
Untreated _____ 0 (standard)
17 _____ −3.5
34 _____ −4.0
68 _____ −2.2

EXAMPLE II

Clean, 12 oz. bottles were filled with orange juice according to the general assay procedure described above in Example I. Each bottle contained 325 ml. of fluid. The bottles were stored for 7 days at 30° F. with daily shaking. At the end of that period, the samples were taste tested as described above. In the case of orange juice, it was found that amounts of THB in the range of 3–40 mg. per bottle (9.2 to 123 mg./liter), with a preferred amount of 5 mg. per bottle (15.4 mg./liter), adequately inhibited oxidation and production of off-tastes.

EXAMPLE III

Homogenized milk samples were prepared by selecting commercially available quart bottles of milk. Some of these bottles were treated with THB by lifting the cap and adding the desired amount. Other bottles of milk were left untreated as controls. Both treated and untreated bottles of milk were exposed to direct sunlight for one hour or to cloudy diffused light for four hours. The controls developed a very strong oxidized flavor after incubation at 30° F. for 24 hours. This flavor could be described as a cardboard or wet paper carton taste experienced especially at the back of the mouth as an aftertaste. Similar tests were repeated with a low concentration of copper sulfate (1 p.p.m.) added to milk which, after a 48 hour period, caused the development of an oxidized flavor without concomitant exposure to sunlight. These tests illustrate the affect of copper ions on the development of oxidized flavor and showed that the additions of THB effectively prevented the development of off-flavors even in the presence of such copper ions. In the case of milk, it was found that THB in amounts of 5 and 10 mg. per quart bottle (5.28 and 10.57 mg./liter respectively) with a preferred amount of 5 mg./liter, adequately inhibited oxidation and production of off-taste in the milk. Even as small an amount as 2 mg./liter gave noticeable improvement in flavor protection. The results of some of these tests are presented in Table II, which summarizes the average scores given the samples by the taste test panel according to the assay procedure described in Example I. The higher the score, the more oxidized the sample. An average score of 1.0 would indicate a milk sample free of oxidized flavor.

*Table II*

THB EFFECTIVENESS IN MILK

| Treatment, THB added in mg./liter | Rank Difference | Average taste Test score |
|---|---|---|
| Untreated | 0 (standard) | 2.8 |
| 5 | −1.3 | 1.5 |

It will be apparent that, in the case of orange juice, 48 mg./liter or 17 mg. per 12 oz. bottle gave excellent protection against development of off-taste when compared with an oxidized control, the amount of 9 mg./liter gave noticeably improved results, and an improvement in prevention of off-taste was noticed with as little as 2 mg./liter. In the case of milk, a noticeable improvement in taste can be detected with THB in the amount of as little as 2 mg./liter. Even as much as 68 to 123 mg./liter provides only a slight off flavor in orange juice under the test conditions. The maximum amount of THB which could be added would also be governed by cost factors and by certain toxicity standards established by the U.S. Food and Drug Administration.

In carrying out the invention, the THB is added in such quantities that the antioxidizing characteristics imparted to the product are retained over any normal storage period. While the amount of THB to be added depends to some extent on the air present in the package, practically this factor is secondary to the time factor and, in fact, even a small amount of THB is sufficient for a wide range of storage conditions and oxygen content. The amount of THB used also depends upon the food substance itself. For example, although a small amount of THB (in the order of 2 to 5 mg./liter) gives noticeable protection to both orange juice and milk, the level of protection is different, a smaller amount of THB being required for the latter. The nature of the food must therefore be conisdered, and THB added according to the susceptibility of the food substance to the development of off-flavors.

The 2,4,5-trihydroxybutyrophenone employed as described above, may be prepared in any suitable way. Several methods for preparing this compound are described in U.S. Patent No. 2,759,828.

It has not been possible to test the many compounds of the class of THB, such as, for example, those disclosed in the aforementioned patent, in order to determine their utility as stabilizers of aqueous suspended food products. It is not unlikely that certain of these may have effectiveness for this purpose. Obviously, if one skilled in the art, after reading this specification, were to test such a compound and find it suitable for the purpose, the use of such equivalent material would be within the scope and spirit of the appended claims.

We claim as our invention:

1. In the method of producing aqueous based liquid food substances stabilized against development of off-tastes due to oxidation, the step which consists of adding thereto the compound 2,4,5-trihydroxybutyrophenone in an amount of at least about 2 mg./liter and having an upper limit determined by the wholesomeness, flavor and appearance of said food substance.

2. The method of producing orange juice stabilized against development of off-tastes due to oxidation comprising the step of adding thereto 2,4,5-trihydroxybutyrophenone in an amount of at least about 2 mg./liter and having an upper limit determined by the wholesomeness, flavor and appearance of said food substance.

3. The method of producing milk stabilized against development of off-tastes due to oxidation comprising the step of adding thereto 2,4,5-trihydroxybutyrophenone in an amount of at least about 2 mg./liter and having an upper limit determined by the wholesomeness, flavor and appearance of said food substance.

4. An aqueous based liquid food substance characterized by the presence therein of 2,4,5-trihydroxybutyrophenone in an amount sufficient to effect substantial stabilization thereof against oxidation and the resultant off-tastes without substantially affecting its wholesomeness, flavor, appearance and other desirable characteristics.

5. An aqueous based liquid food substance stabilized against development of off-tastes due to oxidation characterized by the presence therein of 2,4,5-trihydroxybutyrophenone in an amount of at least about 2 mg./liter and having an upper limit determined by the wholesomeness, flavor and appearance of said food substance.

6. Orange juice stabilized against development of off-tastes due to oxidation characterized by the presence therein of 2,4,5-trihydroxybutyrophenone in an amount of at least about 2 mg./liter.

7. Milk stabilized against development of off-tastes due to oxidation characterized by the presence therein of 2,4,5-trihydroxybutyrophenone in an amount of at least about 2 mg./liter.

References Cited in the file of this patent

UNITED STATES PATENTS 2,759,828    Bell et al. _____ Aug. 21, 1956

OTHER REFERENCES

Am. J. Pharm. 100, 243–245, article by M. B. Matlack, "Some Preliminary Observations on The Coloring Matter of Citrus Juices."